(12) United States Patent
Mueller

(10) Patent No.: US 8,719,072 B2
(45) Date of Patent: May 6, 2014

(54) SYSTEM AND METHOD FOR IDENTIFYING RETAIL TIRE SALES OPPORTUNITIES

(75) Inventor: Scott Mueller, Chagrin Falls, OH (US)

(73) Assignee: Dealer Tire, LLC, Cleveland, OH (US)

( * ) Notice: Subject to any disclaimer, the term of this patent is extended or adjusted under 35 U.S.C. 154(b) by 2455 days.

(21) Appl. No.: 10/790,469

(22) Filed: Mar. 1, 2004

(65) Prior Publication Data

US 2005/0192858 A1    Sep. 1, 2005

(51) Int. Cl.
*G06Q 10/00*    (2012.01)
(52) U.S. Cl.
USPC ....................................... 705/7.31; 705/7.29
(58) Field of Classification Search
CPC .......... G06Q 30/0202; G06Q 30/0204; G06Q 30/0205
USPC .......................................... 705/1, 7.31, 7.29
See application file for complete search history.

(56) References Cited

U.S. PATENT DOCUMENTS

| | | | |
|---|---|---|---|
| 4,773,011 A * | 9/1988 | VanHoose | 701/30 |
| 5,974,395 A | 10/1999 | Bellini et al. | |
| 2003/0050807 A1 | 3/2003 | Hoffman et al. | |
| 2003/0055751 A1 | 3/2003 | Sasnowitz | |
| 2003/0208394 A1 * | 11/2003 | Burris et al. | 705/10 |

OTHER PUBLICATIONS

James H. Byrd, "Manage Your Inventory in Excel", Aug. 10, 2002, Computor Companion, www.computercompanion.com.*
Cooksville Tire—For Medium Truck Tires, "Tire Inspection", May 23, 2003, http://web.archive.org/web/20030523083210/cooksvilletire.com.*
Fisheries and Aquaculture Department, "Economic engineering applied to the fishery industry—3. Capital investments costs" FAO Corporate Document Repository. http://www.fao.org/DOCREP/003/V8490E/V8490e05.htm, Jan. 2, 2010.*
EIM, "Calculating Your Target Inventory Investment" http://www.effectiveinventory.com/article13.html, Jan. 2, 2010.*
LTV, "Turning Customer Data into Profits with a Spreadsheet", http://www.jimnovo.com/LTV.htm, Jan. 2, 2010.*
i2 Automotive Solutions. Automotive and Industrial Overview, www.i2.com, Feb. 4, 2003, pp. 1-31.
i2 Automotive Solutions. i2 Demand Planner, www.i2.com, 2001-2002, pp. 1-5.
i2 Automotive Solutions. Gaining Efficiency in Demand Planning at Toyota Motor sales, USA, www.i2.com, pp. 1-3.
i2 Automotive Solutions. Driving Transporation Efficiency at Cooper Tire, www.i2.com, 2002, pp. 1-3.
i2 Demand Collaboration, www.i2.com, 2001-2002, pp. 1-3.
Manugustics, www.manugistics.com, Jun. 17, 2003, pp. 1-5.
Journal of Retailing and Consumer Services, "A distribution services approach for developing effective competitive strategies against "big box" retailers", Mar. 2004.
Journal of Retailing and Consumer Services, "E-commerce and the retail process: a review", Sep. 2003.
Journal of Purchasing and Supply, "Strategic Operations Management: the new competitive advantage", Sep.-Oct. 2003.

* cited by examiner

*Primary Examiner* — Paul R Fisher
(74) *Attorney, Agent, or Firm* — Jones Day

(57) ABSTRACT

The present invention describes a system and method for evaluating an automotive service center's opportunities for retail tire sales and service, including projecting potential sales and generating other business information for creating a tire service center at an existing repair service center. The present invention may be utilized for service centers which are independent or part of a dealership. The dealership may include both new car sales, used car sales, and a service center.

21 Claims, 1 Drawing Sheet

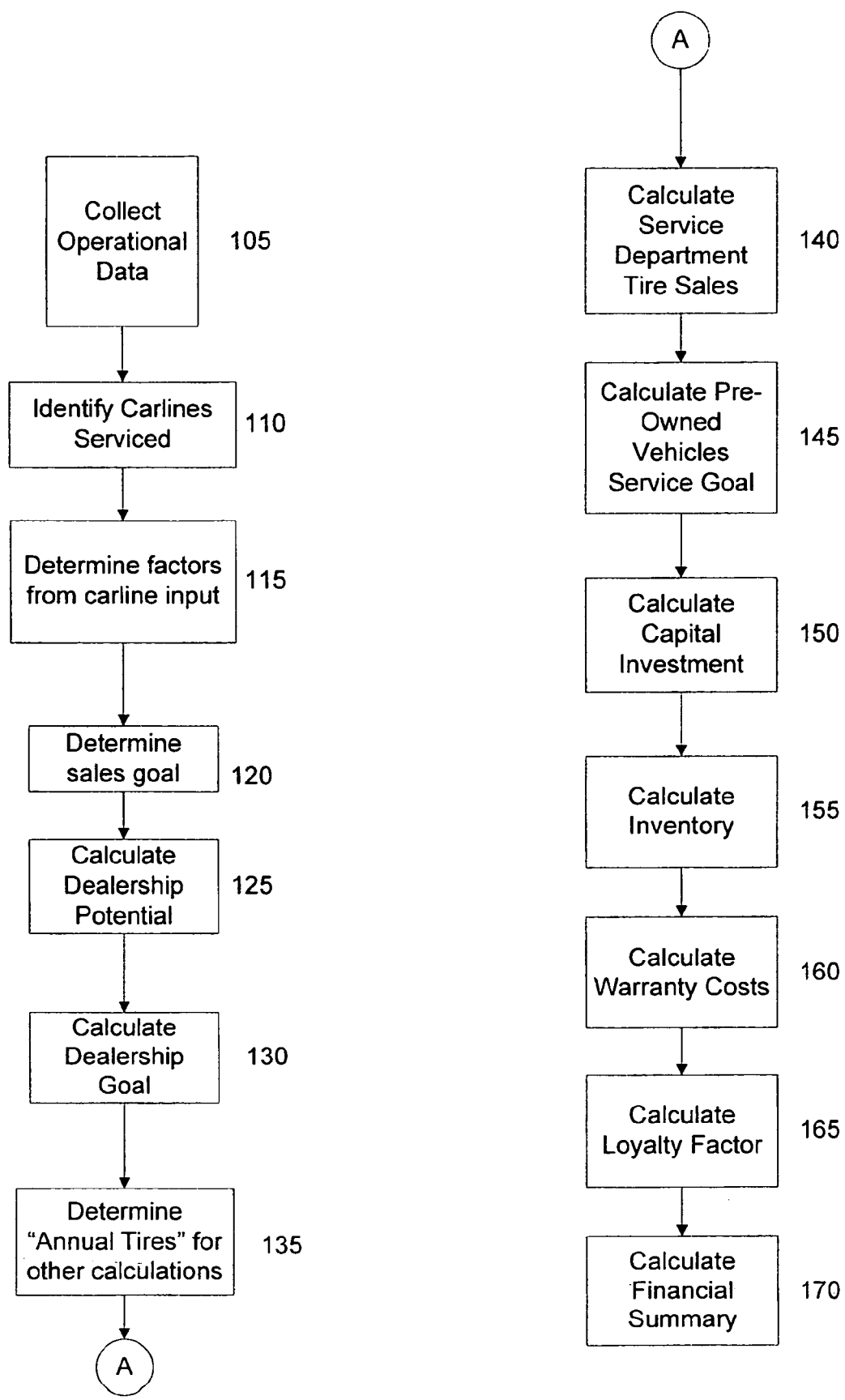

SYSTEM AND METHOD FOR IDENTIFYING RETAIL TIRE SALES OPPORTUNITIES

FIELD OF THE INVENTION

The present invention relates to a method and system of evaluating opportunities of automotive dealerships and service centers regarding the potential sale of automotive tires.

BACKGROUND

Commonly, automotive dealerships and service centers offer a number of services and products to its customers. For example, a typical automotive dealership may sell new, used, factory direct, and certified pre-owned vehicles, including cars, trucks, or house and garden vehicles, directly to consumers. Service centers may offer a wide range of services regarding the inspection and repair of vehicles. The service center may be independent or associated with a dealership. Dealership service centers may provide automotive service and repair for the carline sold by the dealership and possibly other vehicle carlines. To certain customers, dealership service centers may be more attractive than independent service centers because the dealerships are usually familiar with the customer's vehicle, they offer factory-trained technicians, and original factory parts are usually quickly available. In addition, repairs or other service performed on the vehicle under a manufacturers warranty usually must be performed by an authorized dealership service center.

Automotive dealerships and their service center are in a highly competitive market, both within their own carline and among all carlines. In the U.S. market as a whole, there are over 25,000 new car and truck franchises and more than 160,000 aftermarket repair facilities, according to U.S. Government Census statistics. There are estimates that these employ around 590,000 service technicians. Worldwide, new car dealerships are estimated to number about 73,000, heavy truck dealers 3,200, repair shops 448,000, and tire dealers 48,000.

In the service and repair market, both dealerships and independent repair facilities, face the competitive pressure of improving customer satisfaction in order expand or in some instances, to retain market share. Typically, service centers seek to maximize customer satisfaction by providing customers with all their service needs in a timely and cost effective manner. In addition, a typical service center may try to provide a broad range of services and products to customers in an effort to provide increased customer satisfaction and increased market share.

Automotive service centers may also be a significant source of income for the dealership and offer many business opportunities to attract and maintain customers. However, many of these service centers do not offer a complete range of services and products to their customers leaving them open to explore further business opportunities. One such business opportunity is the retail and service of tires.

Tires are a $22 billion dollar retail business in the United States. Tire sales are also highly profitable and offer a high return on investment. A large percentage of consumers purchase tires if such sale is recommended by an automotive professional. A service center that sells and installs tires, offers an opportunity to capitalize on more customer pay visits, to sell additional parts and services, to increase customer loyalty and to increase profits.

Many factors may influence a consumer's decision to replace the tires on their vehicle. For instance, many tires are accompanied by a warranty expressed in a certain number of miles (e.g., 40,000 miles, 60,000 miles, 85,000 miles). Consumers may replace their tires when the warranty has or is about to expire. Others may replace their tires at some arbitrary mileage, after a certain period of time, because of damage to one or more of the tires, because of a reduced price on tires (e.g., a sale), or for other reasons. However, safety is one of the leading reasons why tires are replaced and tread depth is a key factor in determining an appropriate replacement time and tire safety.

Tire tread provides the gripping action and traction preventing a vehicle from slipping and sliding. In general, tires are not safe and should be replaced when the tread is worn down to about $2/32^{nd}$ of an inch or lower. Tires have built-in treadwear indicators that let a motorist know when they should be replaced. These indicators are raised sections spaced intermittently in the bottom of the tread grooves and are visible when a tire tread is worn down to $2/32^{nd}$ of an inch. When they appear even with the outside of the tread, it is time to replace the tire.

Nine percent of passenger cars are being driven on at least one "bald" tire, according to a 2001 survey conducted by U.S. Department of Transportation's National Highway Traffic Safety Administration (NHTSA). This survey considered a tire to be "bald", if the tire had $1/16^{th}$ of an inch or less of tread depth. This definition of "bald" may be used to estimate the tread depth of a tire that is in need of replacement. For instance, if a tire is considered to be bald at $1/16^{th}$ of an inch, replacement of tires should occur on tires having a tread depth of lower than about $3/32^{nd}$ of an inch.

The present invention relates to a system and method for evaluating the potential opportunities related to the potential sale and service of tires, estimating a business plan for automotive dealerships to sell tires directly to customers and implementing such a business plan. In addition, the present invention provides for, as part of the method of the present invention, certain business information collected from the car dealership which is used in the calculation of the tire sales and saving information.

SUMMARY OF THE INVENTION

The present invention describes a system and method for evaluating an automotive service center's opportunities for retail tire sales and service, including projecting potential sales and generating other business information for creating a tire service center at an existing repair service center. The present invention may be utilized for service centers which are independent or part of a dealership. The dealership may include both new car sales, used car sales, and a service center.

In one embodiment of the present invention, a method of collecting data from a car dealership including the type of carline sold, number of vehicles that the repair service center handles per year, the number of days per week in which the service center is open, and the number of used cars sold per year is provided. Utilizing this information, a tire sales goal for the service center is determined. The present system and method calculates tire sales, savings, capital investment, and financial information for the dealership.

In a preferred embodiment, additional data may be collected from the dealership including tire gross profit margin, charge for mount and balance, pay rate per hour for service center employees, pre-owned vehicle tire refurbishment savings goal, tire installation equipment information, billing term days, inventory turn goal, and inventory storage information.

Analyzing the collected data in conjunction with tire tread depth data, an embodiment of the present invention provides a method to calculate dealership potential, dealership goals, dealership tire sales, certified pre-owned savings, warranty cost, capital investment, return on investment, loyalty factor, month pay back, inventory, inventory space requirements, total equipment costs, dealership potential sales figures, and percentage of new and used potential markets that tire center is capturing.

DESCRIPTIONS OF THE DRAWINGS

Embodiments of the invention are illustrated by way of example and not limitation in the accompanying figures in which like numeral references refer to like elements, and wherein:

FIG. 1 is a flowchart of a method according to the invention illustrating which inputs are collected from the dealership and how business information is calculated for an existing service center, such as a car dealership service center;

DETAILED DESCRIPTION

For simplicity and illustrative purposes, the principles of the invention are described by referring mainly to an embodiment thereof. In the following description, numerous specific details are set forth in order to provide a thorough understanding of the invention. It will be apparent, however, to one of ordinary skill in the art, that the invention may be practiced without limitation to these specific details as the invention is to limited only by the claims appended hereto. In other instances, well known methods and structures have not been described in detail so as not to unnecessarily obscure the invention.

It must also be noted that as used herein and in the appended claims, the singular forms "a", "an", and "the" include plural reference unless the context clearly dictates otherwise. Unless defined otherwise, all technical and scientific terms used herein have the same meanings as commonly understood by one of ordinary skill in the art. Although any methods similar or equivalent to those described herein can be used in the practice or testing of embodiments of the present invention, the preferred methods are now described. All publications and statistical data mentioned herein are incorporated by reference. Nothing herein is to be construed as an admission that the invention is not entitled to antedate such disclosure by virtue of prior invention.

In the following description various embodiments of retail tire business system and method, along with methods of construction and use are provided. The examples hereinbelow refer to a particular business plan and method, namely the business potential of a retail tire distribution at a dealership service center. However, it is to be understood that the invention is not limited to evaluating this particular business opportunity, a similar evaluation and installation may be performed to assess the potential of another business opportunity associated with an automotive service center. Additionally, although the present systems and methods are described in conjunction with dealership service centers, those of ordinary skill in the art will appreciate that the present invention may also be suitable in an independent service garage environment.

Automotive dealership service centers are currently in a position to increase existing sales the tire retail market. The present methods and systems offer dealership service centers an easy to implement and profitable business plan. The present methods and systems uses dealership information and industry standards to generate a profitability report for dealerships and also to provide a comprehensive plan to account for investment in inventory, storage space and shop planning.

The present systems and methods may be used to project profitability and installation of any typical tire service center services. Tire service centers services include, but are not limited to multiple manufacture and model tire sales, computerized spin balancing, expert tire mounting, tire rotation, flat repairs, computerized wheel alignment, road service, lawn and garden tire service, medium truck tire service, and construction equipment tires.

The tire service center business plan may be effective for a dealership that sells either new vehicles or certified used vehicles, or preferably, for a dealership that sells both types of vehicles. The present system and methods are described for a vehicle dealership that sells both new and certified used vehicles and currently has an existing service center.

As shown in FIG. 1, the method of the present invention is described in a flow chart which illustrates the data collected and the business opportunity calculated for an existing automotive service center, such as a service center of a car dealership. A component of the method of the present invention is the collection of data regarding the service center, such as the collection of data regarding the operation of the service center 105. The operational data comprises data regarding the existing operations and performance of the service center and may comprise the number of days (or hours) the service center is open per week, the average of daily repair order requests received by the service center, and the carlines service by the service center. In a preferred embodiment, the present invention may be used in conjunction with a dealership wherein new cars or new and used cars are sold. In such an embodiment, the operational data further comprises annual sales of new and/or used cars.

In addition, each carline which is serviced by the service center is identified 110. Each carline identified will require separate analysis to identify opportunities available for the given carline and for the service center in general. For each carline identified, specific carline factors are used to analyze the operational data for purposes of identifying an appropriate sales goal.

These carline service factors comprise (1) the tread depth index, (2) average wholesale tire price, (3) gross profit margin, and (4) a service charge for mounting, balancing valves and other required services, as illustrated at Step 115.

For each carline, the tread depth index is determined based upon the tire tread depth. How a tire wears is related to the type of vehicle, vehicle operator's driving habits, and model of tire. The primarily motivating factor in tire purchases is safety. Tire tread depth is used as an objectively verifiable and quantitative measure of when a tire should be replaced because of safety concerns.

A recent tread depth survey indicated that about 10-15% of the total number of tires witnessed at a service center have inadequate tread depth and are in need of replacement. This range of replacements accounts for the differences among car manufacturers and models of tires. Although each carline may differ, a percentage in this range may be used as the tread depth index. The tread depth index may be any suitable percentage, preferably less than about 30%.

First, if a vehicle dealership service center states that it services Lexus™ vehicles, the carline tread depth index is known. This tread depth index may also be thought of as the percentage of vehicles that are being serviced by an existing dealership service center that are in need of new tires, i.e., the potential customer base for a new tire service center. The tread depth index therefore represents the potential number of customers available to the service center. The service center may thus suggest to the car owner that tire replacement may be necessary at such depth. From these customers, service centers may thus enter into or increase existing sales in the retail tire business.

Second, wholesale tire price is another factor that may be determined from a specified carline 115. Retail and wholesale tire pricing information is available to dealerships, typically through distributors of tires. The average wholesale tire price for the given carline may be determined according to this distributor pricing information. These wholesale prices are again may range from about $55 to about $135 per tire. From the known wholesale prices and the suggested retail prices, a profit margin may be determined for tire sales. Therefore, gross profit margin is another carline specific factor. These profit margins ranges from about 18% to about 30%.

For example, a distributor of tires may recommend a tire profit margin of about 26% for any tires suitable for Lexus™ vehicles, while a distributor may recommend a tire profit margin of about 20% for any tires suitable for BMW™ vehicles. The tire profit margin is thus set according to distributor suggestion, carline manufacturer, estimated, or maximized, according to the present invention. For purposes of these calculation, a tire profit margin of 20% is used.

The mounting, balancing and valve charge is determined by the type of carline being serviced. Labor and installation costs may be calculated according to industry standards or according to service center existing rates and cost. Additionally, a tire distributor may recommend suggested installation prices based on the carline of the vehicle being serviced. These recommended labor and installation prices may be included in typical selling price guides issued by a distributor. For example, a mounting, balancing and valve charge is estimated to be about $20-$30, or $25. Again, the mount and balance charge is dependent on carline usually, and is known once the dealership specifies its carline.

In a preferred embodiment, a dealership may provide further information or such information may be developed. For example, annual new vehicle sales, annual used car sales, annual certified pre-owned sales, average wholesale tire price for a particular carline, tire installation equipment needs, and inventory details, may be gathered at step 105, which details the collection of operational data. Any suitable data entry system may be used to organize the dealership inputs.

In addition to gathering the type of vehicle sold (the carline), the number of days the service center is open per week and the average daily number of repair order requests the service center receives, at step 105 of FIG. 1, these optional operation variables are collected. If the service center is open on Saturday the work week is calculated using 5.5 days, if the center is not open, the weekly repair order is calculated with 5 days. Operational variables may further include total number of employees, employee hourly wage, business hours, repair orders requested vs. repair orders handled over a course of time, and average time spent on various repair jobs, measured in number of hours. Typically a technician's pay rate per hour is about $30 per hour.

If a service center does not currently supply and install tires, the service center must invest in tire installation equipment in order to implement a tire business plan. These capital investments will be taken into account in determining the business opportunity information for each dealership. For example, a dealership may purchase one or more tire changers for its service center. Any suitable tire changer and associated price may be installed by a service center. Other necessary equipment includes tire balancers. Any suitable balancer and associated price may be installed in the service center. Additionally, a dealership may purchase one or more additional miscellaneous pieces of tire equipment. This purchase and installation of the equipment will be used to calculate capital investment information for the business opportunity at step 150.

The billing term days for the dealership may be provided by the dealership, but the default is set to three (3) days or thirty (30) days. The Billing Term Days (Alliance Standard 3 days) entry may thus be supplied by a dealership.

In a preferred embodiment, the dealership may project its desired Inventory Turn Goal step 105. Inventory turn is the number of times a retailer sells its entire inventory each year. Inventory turn is calculated by taking the current year's cost of goods sold or cost of revenues (found on the income statement) and dividing by the average inventory for the period. To be in the business of selling tires, it is necessary to stock tires. Consumers are more likely to purchase tires if a supplier has it in stock. However, it is financially unwise to have a lot of money tied up in slow moving inventory. The inventory turn may be any suitable number from about 2 to about 20, preferably about 12. The default in inventory turn is set to 12, but again this may be specified by the dealership, estimated by industry standards, or optimized according to the present business plan calculations.

Next, a dealership sales goal is calculated 120. The dealership may provide this dealership sales goal representative of the new tires it wishes to sell. Alternatively, this sales goal may be estimated, set to an industry default, or optimized according to the present system and method. This sales goal may be represented as a percentage of the opportunities identified by the repair order index or as a specific number of targeted cars. If the dealership wishes to state its sales goal in a percentage, this is labeled as a "% Potential" and may be set to any suitable goal, such as servicing about 20-35%, or preferably, about 33% of the total number of opportunities.

The % Potential is the percentage of sales a dealership projects to gain, but the dealership must also account for the tread depth index. In other words, a dealership may see about 100 cars per day at its service center (100 repair order requests). Of these 100 cars, about 12 cars have tires in need of replacement based on tire tread depth. Of these 12 cars, the dealership should aim to sell to about ⅓ of the 12 cars or to about 4 cars. For this example, 33% would be the % Potential.

The sales goal may also be expressed in number of cars. For example, a dealership may state its goal to sell new tires to four (4) cars per day. This number may be represented as the number of tires the dealership hopes to sell or as a number of cars (tires divided by four (4)) the dealership hopes to capture. The sales goal measured in cars and the sales goal as the % Potential may be calculated from each other, as long as the other is specified.

Next, the potential business opportunity which may be opportunities from selling tires at a service center is then calculated 125. Dealership potential includes the annual tires units necessary to service both vehicles at the existing service center and in a preferred embodiment the certified pre-owned car market at a dealership based service center. Potential figures are calculated using the tire tread index, but not the sales goal. The estimated total replacement potential is based on the number of service center repair orders recorded daily, the number of days per week the service center is open, and the tread depth index. This potential may be scaled to an estimated number of sales (measured in tires) using the sales goal as determined in step 120.

In a preferred embodiment, the used car potential is calculated based on the number of used cars sold and pre-owned vehicles service goal. The pre-owned vehicles service goal is about 20-100%, usually about 25%. In the pre-owned vehicle market, the goal index of about 25% is used to estimate the number of cars a dealership expects to refurbish with new tires before sale of a used vehicle.

Potential annual units[service center]=(repair orders per year)*(tread depth index)*(4).

Potential annual units[used cars]=(annual used cars sold)*(Pre-Owned Vehicles Service Goal)*(4).

These two potentials in the new and used car markets are added together to generate an Estimated Total Annual units sold. The annual units may be divided by the number of service center days open per year to generate the potential number of daily units sold. Using wholesale tire prices these potentials may be converted into daily and annual sales potential figures.

The potential in annual units and in daily units is next used to calculate the potential annual and daily labor hours. The potential annual and daily labor hours are calculated by using the potential numbers and dividing by four (4).

"Dealer Goals" (step 130 in FIG. 1) is calculated. Four (4) inputs are needed to calculate the Dealer Goals 130. First, a sales goal measured in the number of cars that dealer will close per day (Daily Sales Goal) is needed, as discussed above at step 120. Next, the tire gross margin is determined according to type of carline or through dealership input. Also the charge for the services of mounting and balancing and an employee pay rate per hour is used. From these four (4) inputs a "% Potential" is determined. This % Potential is a function of the sales goal measured in number of cars divided by the product of the average daily repair orders and the tread depth index.

% Potential=(Daily Sales Goal[cars])/((daily repair orders)*(tread depth index))

This % Potential may also be thought of as a share that the tire service center hopes to capture of all the bald tires it observes at its service center. The % Potential is multiplied by four (4) to arrive at the "Daily Tires" sold. The "Annual Tires" sold is a function of the daily tires multiplied by the number of business days open per year. The "Annual Tires" figure, measured in number of tires per year, may be used in determining tire sales and other calculations in the business plan for the dealership. Annual Tires accounts for both the tread depth index and the sales goal, which scales the financial information into a realistic business opportunity for a service center to evaluate into connection with entering into a tire market. "Annual Tires" as calculated at step 135, takes into account the tires to be sold to customers at the retail tire center but does not include the tires that will be used in the refurbishment savings plan for the used car market.

"Service Department Tire Sales" figures are next calculated and may include the dollar amount of annual tire sales, the profit margin of the tire parts sold, the profit margin of the tire services, and the total gross profit of the service center. Refer to FIG. 1, step 140. "Annual Tire Sales" are calculated according to the following equation:

Tire Sales[annual]=((Average Wholesale Tire Price)/(1−Tire Gross Margin)+(Mounting, Balancing and Valve Charge))*(Annual Tires)

Tire Parts Margin is calculated according to the following equation:

Tire Parts Margin=((Average Wholesale Tire Price)/(1−Tire Gross Margin))*(Annual Tires)*(Tire Gross Margin)

Tire Service Margin is calculated according to the following equation:

Tire Service Margin=(Mounting, Balancing and Valve Charge)*(Annual Tires).

Total Tire Gross Profit=(Tire Parts Margin)+(Tire Service Margin).

Similar "Service Department Tire Sales" figures may be calculated for "Daily" basis using the number of days that a service center operates per year. The Annual Tire figure from step 135 is used to calculate "Annual Labor hours". Annual labor hours is the "Annual Tires" figure divided by four (4). Annual Labor hours multiplied by a pay rate (per hour) generates "Tire Labor Cost".

The "Tire Net Profit Before Overhead" is calculated using the Tire Labor Cost and the Total Tire Gross Profit.

Tire Net Profit Before Overhead=Total Tire Gross Profit−Tire Labor Cost.

Per Bay Hours may be calculated. These figures represent the dollar amount in sales, per individual tire (or bay), with four (4) bays to a vehicle. The Daily Sales Figures may be divided by the Annual Labor hours to arrive at the Per Bay Hour sales figures.

Next at step 145, "Pre Owned Vehicles Service Goal" figures may be calculated. This optional, but preferred part of the business plan is based on the assumption that a dealership will replace the tires on a used car before selling it to a customer as a used vehicle or as a manufacturer's certified pre-owned vehicle. The costs of outsourcing the replacement of these tires on the used vehicles before sale may be reduced if the dealership has an internal tire service center. Instead of outsourcing this expense, the tires may be supplied internally. This part of the business plan is thus a savings program that reduces the cost of buying tires externally for used vehicles before sale. The percentage or the certified pre-owned vehicle service goals may be any suitable goal, preferably about 25%. However, a dealership may have a practice of replacing all the tires on used cars before sale to the public, therefore the pre-owned service goal would be 100% for that particular dealership.

In order to calculate the expected savings from an internal tire service center, the costs of refurbishing used cars with new tires at the internal tire service center must be determined. The annual units of tires used in the pre-owned vehicle market is a function of the number of pre-owned vehicles sold and the pre-owned service goal. Once the annual units of tires sold is calculated labor cost is determined by dividing by four (4). These annual units in the used car market may be scaled down to daily units, using the number of days the service center is operable per year. The annual cost of supply new tires to the used cars at a dealership is calculated by multiplying the annual tire units sold by the average wholesale tire price. The pay rate per hour multiplied by the tire labor generates the annual cost of supplying labor for the used car market. The annual cost of supplying new tires and the annual cost of supplying labor together is the cost of refurbishing the used car market with new tires internally.

This cost of refurbishing the used car market with new tires internally must be compared to an outsourcing expense (what the dealership would pay to refurbish used cars without an internal service center). These outsourcing costs are estimated by remembering that tire distributors recommend a gross tire profit margin of about 20%. Thus the cost of purchasing new tires for an external source for the used cars would be the cost of new tires internally divided by one (1) minus the gross profit margin. This equation may be represented as:

Cost of New tires externally=cost of new tires internally/(1−gross profit margin).

To factor in the cost of external tire labor, the total number of annual units sold for the used car market must be multiplied by a factor. This factor represent the cost of supplying labor to replace one tire externally. This factor should be less than a typical hourly pay rate, because it will not take a technician one (1) hour to change one (1) tire. Therefore this factor (the labor cost/tire externally) is estimated at about $10/tire.

From the raw material external tire price and external tire labor costs, a total external dollar amount may be found that represents the cost of outsourcing tire refurbishment for the used car market. This total cost of outsourcing is compared to the cost of services these used cars internally. The difference represents the total in cost savings that may be saved by a dealership if it offers a tire service center for refurbishing its used cars.

As an additional embodiment of the business plan, a dealership may install tire changing equipment in a service center. FIG. 1, step 150 details the capital costs of the proposed business plan labeled "Capital Investment". A dealership may have to invest in equipment for tire installation if its existing service center is not so equipped. The business system and methods of the present invention accounts for such capital investment in tire installation equipment and inventory. A service center may have to purchase tire changers and tire balancer equipment. Quantity and list prices are easily determined for such equipment. Tire changers typically range from about $4000 to about $10,000. The average tire changer price is thus defaulted to $6000. Tire balancers typically range from about $6000 to about $17,000. The average tire changer price is thus defaulted to $13,000. From these equipment costs, a total equipment investment may be determined for the tire service center.

Miscellaneous tire equipment costs are estimated for the capital investment calculations. Other tire equipment costs are typically about $1200 to about $2000, default set to about $1700. The total equipment cost is the sum of the tire balancer(s), tire changer(s) and miscellaneous costs.

Other factors to determine for the "Capital Investment" section of the business system and method includes billing term days and inventory turn goal. These may be supplied by the dealership, set to industry standards, or optimized by the business plan of the present invention. Default for the billing term days is set to three (3) days or thirty (30) days and default for the inventory turn is set to 12. These factors thus determine the inventory capital investment a dealership must make in order to enter in the tire retail market.

The number of inventory units that the tire service center will want to have in stock at any particular moment is a function of inventory turn and annual units of tires in both the new and used markets. The inventory in tire units is represented by the following equation:

Inventory[tires]=(Annual Tires[new]+annual units [pre-owned])/inventory turn goal.

The inventory cost is inventory multiplied by the average wholesale tire price. In order to arrive at the Net Inventory Investment for the dealership, the inventory cost must be reduced by a payable float. The Payable inventory float is calculated according to the following equation:

Payable inventory float=((Billing Terms Days)/365)* (Annual Tires [new]+annual units[pre-owned])* (average wholesale tire price).

The net inventory investment is thus the inventory minus the payable inventory float. The net inventory investment and the total equipment costs are added together to arrive at the total capital investment for the tire service center.

Inventory space requirements be may calculated according to the present business system and methods. See step 155, FIG. 1. The inventory space requirements are directly related to the dealership inventory goals. The Inventory represented in tire units is multiplied by a factor to determine the space requirements (measured in square feet) for inventory storage. These factors are determined according to which wall system, rack, or cart storage device the dealership decides to use to store the tire inventory. Refer to Table 3. For instance, if a dealership uses a wall system that has two tiers of tires, the inventory is multiplied by a factor of one (1) in order to arrive at the square footage necessary to store the tire inventory.

TABLE 3

| | sq ft |
|---|---|
| Linear Feet of Rack | Inventory * (1.4) |
| Wall System 2 Tiers | Inventory * (1) |
| Wall System 3 Tires | Inventory * (0.667) |
| Wall System 4 tiers | Inventory * (0.5) |
| Rolling carts 2 tiers | Inventory/(14) |
| Rolling carts 3 tiers | Inventory/(22) |

The business system and method of the present invention also factors satisfying customer tire warranty situations and customer loyalty impact into a proposed tire service center. "Warranty of OE Tire Cost" is calculated at step 160, FIG. 1. The obligation of outstanding warranties on vehicle parts is a liability to any dealership. A dealership that offers a tire service center would most likely extend any typical parts warranty to include tires. The warranty service by the dealership will obviously reduce profits for the tire service center. These costs in satisfying warranty claims may be estimated in the tire service center on an annual basis.

The Number of Warranty claims a car dealership may receive during the year is a function of the number of annual new cars sold multiplied by four (4) (the number of tires per car) and multiplied by another warranty factor. This warranty factor is about 1.15% and represents the percentage of original equipment tire warranty claims that may be expected in the retail tire market. This warranty factor includes the estimated total number of legitimate manufacture defects and road hazard claims that may be made on tires per year.

Should the dealer choose to satisfy these legitimate original equipment tire warranty claims, a dealership will have to supply both a new tire and labor for installation. These costs are calculated in known manners, using the number of warranty claims as calculated above, average wholesale tire price and labor costs.

The net warranty costs may be calculated after considering the fact that many dealerships may be reimbursed directly from the tire manufacturers after satisfying warranty claims. Also, a dealership may receive reimbursement directly from the car manufacturers for satisfying a warranty claim. These two reimbursements combined account for about 75% of the total warranty cost a dealership might incur annually. Therefore net warranty costs is roughly 25% of the total warranty cost. Net warranty cost may also be thought of as customer goodwill. In other words, the cost of supplying original equipment tire warranty satisfaction to consumers is equal to the value associated with the goodwill a dealership generates.

The loyalty factor may also be considered in the proposed tire business system and methods. Refer to step 165, FIG. 1.

Because a dealership service center offers tire sales and installation, a customer is more likely to visit the service center for her car needs, including maintenance, repair, and replacement. To account for such increased volume to the service center, a loyalty factor is calculated. A customer of a dealership who is offered full tire services at the dealership service center does not have to visit another tire service center. The loyalty factor may be represented as the reduction in customer visits to after market competitors, which may be measured daily or annually. This total reduction is a function of "Annual Tires" sold at service center divided by a loyalty variable. This loyalty variable is estimated from about 3 to about 6, preferably about 4.5. The reduction in customer visits to competitors equals the loyalty factor.

Step 170 "Financial Summary" in FIG. 1, summarizes the financial information generated for the tire service center system and method. In one embodiment of the present invention, the following financial information may be determined for a service center that wishes to enter the retail tire business: the sales, service lane tire net profit, certified pre-owned savings, net OE tire warranty goodwill cost, total net profit and expense savings, capital investment, return on investment (ROI), month pay back and reduction in customer visits to competitors.

Any one of the preceding figures may be calculated as "goal", "potential" and/or "share %" (percentage of potential captured). The share percentages may be optimized, set by the dealership, or generated by dividing the goal numbers by the potential numbers.

"Tire Sales" was calculated in the "Service Department Tire Sales" section of FIG. 1 (step 140). "Service Lane Tire Net Profit" is equal to the "Tire Net Profit Before Overhead" also calculated in the "Service Department Tire Sales" section of FIG. 1 (step 140). "Certified Pre-Owned Savings" was calculated in step 145 of FIG. 1. The "Net OE Tire Warranty Goodwill Cost" is the same as "net warranty cost" as calculated in the warranty section of FIG. 1 (step 160).

"Total Net Profit and Expense Savings" is the sum of the Tire Sales, Service Lane Tire Net Profit and Certified Pre-Owned Savings, minus the Net OE Tire Warranty Goodwill Cost.

Total Net Profit and Expense Savings=(Tire Sales)+
(Service Lane Tire Net Profit)+(Certified Pre-
Owned Savings)−(Net OE Tire Warranty Cost).

"Capital Investment" is the same as the total capital investment calculated at step 150. "Return on Investment (ROI)" is calculated as the "Total Net Profit and Expense Savings" divided by the "Capital Investment". "Month Pay Back" is the ROI multiplied by 12 months. "Reduction in number of customer visits to aftermarket retailers" is the same number as calculated as the Customer Loyalty in FIG. 1 (step 165).

The "potential" financial values may be calculated. The "Potential Tire Sales" is the same as the "Potential Annual Sales" as calculated in the "Dealer Potential" step 130. In the "Dealer Goal" section of FIG. 1 (step 135), "% Potential" was calculated. The "Service Lane Tire Net Profit" divided by % Potential yields the "Potential Service Lane Tire Net Profit". The Potential Certified Pre-Owned Savings is equal to the goal Certified Pre-Owned Savings. The "Potential Total Net Profit and Expense Savings" is equal to the sum of the potential Service Lane Tire Net Profit and the potential Certified Pre-Owned Savings. The "Reduction in number of customer visits to aftermarket retailers" is scaled to a potential "Reduction in number of customer visits to aftermarket retailers" by dividing by the % Potential.

The present tire business system and methods require a dealership to supply operational data to be used in the business system and method. Dealerships may supply the type of carline sold, annual car sales, average daily repair orders or car count, whether the service center is open on Saturdays. Additional data that may be supplied preferably includes carline tread depth index based on car manufacturer, carline average wholesale tire price, annual new car sales, annual used care sales, annual certified pre-owned car sales, daily service drive tire sales goal, desired tire gross profit margin, charge for mount and balance, pay rate per hour, pre-owned tire sales goal, price and type of charger (if equipment needed), quantity of chargers, price/type of balancer (if equipment needed), quantity of balancers, miscellaneous tire equipment cost, billing term days, and inventory turn goal.

The tire business system and method of the present invention may customize the following variables in the proposed business plan. Each of these variables may be supplied, set to an industry default or adjusted and calculations reiterated until acceptable to the dealership. These variables include profit margin, inventory turns, the "Sales Goal" as measured by a number of cars, a % Potential (representing the percentage of the bald tire market the dealership hopes to capture), and the percentage of the refurbishment market for certified pre-owned cars that the dealership will supply as compared to outsourcing such costs.

The following dollar amounts and figures may be calculated according to one embodiment of the business system and method of the present invention: dealership potential, dealership goals, tire sales, savings in the pre-owned car market, tire net profit, warranty costs, capital investment, return on investment, month pay back, loyalty factor, inventory costs, inventory space requirements, total equipment costs, dealership potential sales figures, a financial summary and percentage of new and used potential markets that tire center is capturing.

The calculations and data collection of the present invention may be performed on any known system, such as a spreadsheet application or any other computer based application. These calculation may also be generated manually. The financial information of the business plan may be displayed according to the present invention in any known manner. A spreadsheet application provides a means of calculation and display for the tire business plan of the present invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, which is intended to be defined by the following claims and their equivalents in which all terms are meant in their broadest reasonable sense unless otherwise indicated.

What is claimed is:

1. A computer-implemented method of evaluating potential sales and business opportunities relating to establishing tire sales at an automotive service center that does not currently sell tires by calculating metrics that include a projected tire sales for the automotive center, comprising:

collecting operational data from the service center and storing the operational data in a computer-readable memory, wherein the operational data comprises an average number of service or repair order requests per time period, a number of days the service center is open per time period, identification of one or more carlines serviced, and a tread depth of one or more tires on vehicles serviced by the automotive center during the order requests;

calculating a maximum expected number of tires to be sold for each carline per time period using one or more data processors and storing the maximum expected number in a computer-readable memory, wherein the maximum expected number is equal to the average number of repair order requests per day multiplied by the number of days the service center is open per time period multiplied by four multiplied by a tire tread index, wherein the tire tread index varies according to carline and represents a percentage of cars serviced by the service center which have a tire tread depth less than a tread depth threshold;

determining a tire sales goal for each carline, the tire sales goal being a fraction of the maximum expected number using the one or more data processors and storing the tire sales goal in a computer-readable memory; and calculating the projected tire sales for the automotive service center using the one or more data processors by adding an average retail tire price for a tire associated with a carline to a charge for services involved in mounting and balancing a tire to generate a sum, multiplying the sum by the tire sales goal for the carline, and scaling to the time period to generate a tire sales for a carline, and summing the tires sales for each carline to determine a total projected tire sales for the automotive service center and storing the projected tire sales for the automotive service center in a computer-readable memory.

2. The method of claim 1, wherein the time period is one year.

3. The method of claim 1, wherein the operational data further includes an employee pay rate per hour;
wherein the method further includes calculating a net profit based on the projected tire sales for the automotive service center and the employee pay rate per hour.

4. The method of claim 1, wherein the tire tread index is no greater than 30%.

5. The method of claim 1, wherein the tire tread index is 10% to 15%.

6. The method of claim 1, further including calculating total savings, net profit, warranty costs, capital investment, return on investment, and total equipment costs using the projected tire sales for the automotive service center.

7. The method of claim 1, where the existing service center is affiliated with a car dealership that sells new, used, and certified pre-owned cars.

8. The method of claim 1, further including calculating a capital investment cost, wherein the capital investment cost is determined by adding a cost of purchasing tire installation equipment and an inventory investment cost, wherein the inventory investment cost is calculated by dividing the projected tire sales by an inventory turn goal and multiplying by an average wholesale tire price associated with a carline.

9. The method of claim 1, further including calculating an inventory space requirement.

10. The method of claim 1, further including calculating a cost of satisfying warranty claims wherein the cost is determined by multiplying a number of new annual car sales for a dealership by a warranty factor.

11. The method of claim 1, further including calculating a loyalty factor, wherein the loyalty factor is determined by dividing an annual tires sold by a loyalty variable.

12. The method of claim 1, wherein the tire tread index for a carline is calculated by measuring a tread depth for a plurality of cars in the carline, determining a number of the plurality of cars having a tire tread depth less than a tread depth threshold, and determining the tire tread index based on the number of cars having a tire tread depth less than the tread depth and the number of cars in the plurality of cars in the carline.

13. The method of claim 1, further comprising the step of determining whether to establish tire sales at the automotive center.

14. A computer-implemented method of evaluating potential sales and business opportunities relating to establishing tire sales at an automotive service center affiliated with a car dealership that does not currently sell tires, wherein the dealership sells new, used, and certified pre-owed cars by calculating metrics that include a business opportunity metric, comprising:

collecting operational data from the service center and storing the operational data in a computer-readable memory, wherein the operational data comprises an average number of service or repair order requests per time period, a number of days the service center is open per time period, identification of one or more carlines serviced, and a tread depth of one or more tires on vehicles serviced by the automotive center during the order requests;

calculating a maximum expected number of tires to be sold for each carline per time period using one or more data processors and storing the maximum expected number in a computer-readable memory, wherein the maximum expected number is equal to the average number of repair order requests per day multiplied by the number of days the service center is open per time period multiplied by four multiplied by a tire tread index, wherein the tire tread index varies according to carline and represents a percentage of cars serviced by the service center which have a tire tread depth less than a tread depth threshold;

determining a tire sales goal for each carline, the tire sales goal being a fraction of the maximum expected number using the one or more data processors and storing the tire sales goal in a computer-readable memory; and calculating a projected tire sales using the one or more data processors and storing the projected tire sales in a computer-readable memory by adding an average retail tire price for a tire associated with a carline to a charge for services involved in mounting and balancing a tire to generate a sum, multiplying the sum by the tire sales goal for the carline, and scaling to the time period to generate a tire sales for a carline, and summing the tires sales for each carline to determine a total projected tire sales;

calculating a certified pre-owned savings associated with tire sales using the one or more data processors and storing the projected tire sales in a computer-readable memory, wherein the certified pre-owned savings is calculated by comparing a cost associated with outsourcing replacement of certified pre-owned car tires with a cost associated with internally supplying new tires to the certified pre-owned cars; and calculating the business opportunity metric using the one or more data processors and storing the business opportunity metric in a computer-readable memory by adding together the total projected tire sales and the certified pre-owned savings.

15. The method of claim 14, wherein the operational data further includes an employee pay rate per hour;

wherein the method includes calculating a net profit based on the projected tire sales for the automotive service center and the employee pay rate per hour.

16. The method of claim 14, wherein the tire tread index is 10% to 15%.

17. The method of claim 14, further including calculating total savings, net profit, warranty costs, capital investment, return on investment, and total equipment costs using the projected tire sales.

18. The method of claim 14, wherein the cost associated with internally supplying new tires is calculated by multiplying a number of annual certified pre-owned cars sold by a pre-owned car service goal and adding labor costs for replacing tires, and wherein the cost associated with outsourcing the replacement is calculated using an average retail tire price.

19. The method of claim 14, further including calculating a capital investment cost, wherein the capital investment cost is determined by adding a cost of purchasing tire installation equipment and an inventory investment cost, wherein the inventory investment cost is calculated by dividing the projected tire sales by an inventory turn goal and multiplying by an average wholesale tire price associated with a carline.

20. The method of claim 14, further comprising the step of determining whether to establish tire sales at the automotive center.

21. A computer-implemented method of evaluating potential sales and business opportunities relating to whether to establish, continue, or expand selling tires at an automotive service center by calculating metrics that include a projected tire sales for the automotive center, comprising:

collecting operational data from the service center and storing the operational data in a computer-readable memory, wherein the operational data comprises an average number of service or repair order requests per time period, a number of days the service center is open per time period, identification of one or more carlines serviced, and a tread depth of one or more tires on vehicles serviced by the automotive center during the order requests, said operational data not specific to prior tire sales;

calculating a maximum expected number of tires to be sold for each carline per time period using one or more data processors and storing the maximum expected number in a computer-readable memory, wherein the maximum expected number is equal to the average number of repair order requests per day multiplied by the number of days the service center is open per time period multiplied by four multiplied by a tire tread index, wherein the tire tread index varies according to carline and represents a percentage of cars serviced by the service center which have a tire tread depth less than a tread depth threshold;

determining a tire sales goal for each carline, the tire sales goal being a fraction of the maximum expected number using the one or more data processors and storing the tire sales goal in a computer-readable memory; and calculating the projected tire sales for the automotive service center using the one or more data processors by adding an average retail tire price for a tire associated with a carline to a charge for services involved in mounting and balancing a tire to generate a sum, multiplying the sum by the tire sales goal for the carline, and scaling to the time period to generate a tire sales for a carline, and summing the tires sales for each carline to determine a total projected tire sales for the automotive service center and storing the projected tire sales for the automotive service center in a computer-readable memory.

\* \* \* \* \*